(No Model.) 6 Sheets—Sheet 1.

F. L. CLARK.
ENGINEER'S BRAKE VALVE.

No. 496,638. Patented May 2, 1893.

FIG. 1.

WITNESSES:
R H Whittlesey
F. E. Gaither

INVENTOR,
Francis L. Clark.
by Snowden Bell,
Att'y.

(No Model.)
6 Sheets—Sheet 5.

F. L. CLARK.
ENGINEER'S BRAKE VALVE.

No. 496,638. Patented May 2, 1893.

FIG. 5.

WITNESSES:
R. H. Whittlesey
F. E. Gaither

INVENTOR,
Francis L. Clark,
by J. Snowden Bell,
Att'y.

UNITED STATES PATENT OFFICE.

FRANCIS L. CLARK, OF WILKINSBURG, ASSIGNOR TO THE WESTINGHOUSE AIR BRAKE COMPANY, OF PITTSBURG, PENNSYLVANIA.

ENGINEER'S BRAKE-VALVE.

SPECIFICATION forming part of Letters Patent No. 496,638, dated May 2, 1893.

Application filed January 3, 1893. Serial No. 457,017. (No model.)

*To all whom it may concern:*

Be it known that I, FRANCIS L. CLARK, a citizen of the United States, residing at Wilkinsburg, in the county of Allegheny and State of Pennsylvania, have invented or discovered a certain new and useful Improvement in Engineers' Brake-Valves, of which improvement the following is a specification.

My invention relates to appliances, known as engineers' brake valves, for effecting and regulating the supply and release of air under pressure, from a main air reservoir, to and from a main air or train pipe, in a fluid pressure automatic brake apparatus, and its object is to provide an appliance of such character embodying the advantages of simplicity, compactness, facility of operation, ready accessibility to all working parts without breaking pipe connections, and freedom from liability to undue or unequal wear of its regulating cock.

To this end my invention consists in certain novel devices and combinations hereinafter fully set forth.

In the accompanying drawings.

In the practice of my invention I provide a valve chamber or casing, composed of an upper section 1 and a lower section 2, which are connected by tap bolts 3, the lower section being provided with a threaded projection $2^a$, for connection to any suitable support. A regulating cock or valve, which, in this instance, is a cock 5, of the ordinary plug type, is fitted in a case 6, on the upper section 1 of the valve casing, and is adapted to be moved about its axial line, in its case 6, by a lever handle 7, formed or fixed upon a short shaft 8, which is journaled, in line axially with the cock 5, in a stand $8^a$, on the lower section 2 of the valve casing. The cock 5 is provided with a transverse projection or tenon 10, on its end nearest the lever handle shaft 8, said tenon fitting a transverse recess or mortise 11, in the adjacent end of the shaft. The cock 5 and its operating lever, are thus coupled by a clutch connection, so that no strain, tending to wear the cock unequally, or out of round, is imposed in effecting movements of the cock. A spring stop or detent 12, is fitted in the handle 7, in order to limit the range of movement of the latter to the length of a circumferential recess in a guide segment 13, formed on the stand $8^a$, said recess having a notch or depression $14^a$ at one end, a shoulder $14^c$ at the other, and intermediate notches 14, $14^b$, and 15, the several notches and the end shoulder being located in position to be engaged by the outer end of the detent 12, in different adjustments of the cock 5, as hereinafter described.

A pipe or passage 17, adapted to be connected with the main air reservoir of the brake mechanism in which the appliance is employed, is connected to a threaded opening or nozzle in the lower valve casing section 2, and establishes continuous communication between the main air reservoir and a main air reservoir pressure chamber $17^a$ in the lower section 2. A port or passage $17^b$ leads transversely from the chamber $17^a$ to a nozzle or threaded connection, $17^c$, for the attachment of a pipe leading to the main air reservoir pressure gage, and a vertical port or passage $17^d$, leads to a transverse passage $17^e$, having an opening in which is seated an extra pressure valve 34, fitted to work in a chamber $34^a$, formed in the upper casing section 1 and closed by a removable cap $34^b$. The valve 34 is normally held to its seat by a spring $34^c$. A port $17^f$ leads from the chamber $34^a$, through the adjacent portion of the shell 6, of the regulating cock 5, in such location as to register, in one position of said cock, with a transverse port $5^a$ therein, and, through said port $5^a$, to communicate with a port $18^b$, leading to a chamber $18^a$, communicating with the main air or train pipe, and with a port $22^a$, leading to a piston chamber 22. A lateral port $17^g$, leads from the port $17^d$, through the adjacent portion of the shell 6, in such location as to register with a circumferential groove or recess 5$^b$ in the cock 5, said recess having its middle portion in a plane transverse to the cock, and its end portions extending in opposite directions from its middle portion, and being in planes longitudinal to the cock. A pipe or passage 18, connected to and opening into a main air pipe pressure chamber 18$^a$, in the lower section 2 of the valve casing, leads therefrom to a connection with the main air or train pipe, which is thus maintained in communication with the chamber 18$^a$, and, through said chamber and the port 18$^b$ leading therefrom, such communication extends to the surface of the cock 5. A movable abutment 19, which is preferably, as shown, a piston, but which may, if preferred, be a flexible diaphragm, is fitted to work freely in a chamber 22, the lower side of which is open to the chamber 18$^a$, so that the piston 19 is subject on its lower side to the pressure in the main air or train pipe. The piston 19 is secured upon a stem 20, the lower end of which carries a discharge valve 21, which is adapted to close upon a seat formed in a bushing 21$^a$, fitted in the lower wall of the chamber 18$^a$, the seat of the valve being formed at the inner end of a discharge passage 23, leading from the chamber 18$^a$ to the atmosphere. Ports 22$^a$, 22$^b$, lead from the chamber 22, above the piston through the case 6, to the surface of the cock 5, the port 22$^a$ being located in position to communicate with a port 5$^a$ in said cock, as before explained, and the port 22$^b$ being located in position to communicate, in certain positions of the cock, with a circumferential groove or recess 5$^c$, thereon, said recess communicating, by a port 5$^d$, in the cock, with a similar recess 5$^e$, located in the same transverse plane of the valve. A preliminary exhaust or discharge port 38, leads through the casing 6, in the same transverse plane as the recesses 5$^c$ and 5$^e$, from the surface of the cock 5 to the atmosphere. The piston chamber also communicates, above the piston, through a port or passage 25, with a nozzle or connection 25$^a$ for the attachment of a pipe leading to a small supplemental reservoir, in order to provide an increased capacity for storage of air under pressure. In this instance, three passages 25, each of comparatively small diameter are shown, these being employed to avoid weakening the shell of the lower casing section 2 by a single large passage. A port or passage 25$^b$ leads from the passages 25 to a nozzle or threaded connection 25$^c$, for the attachment of a pipe leading to the main air or train pipe pressure gage. A pipe or passage 39, of materially larger diameter than the discharge opening which is controlled by the valve 21, leads from a discharge chamber 39$^a$ in the lower casing section 2 to the atmosphere. Communication between the main air reservoir pressure chamber 17$^a$ and the main air pipe pressure chamber 18$^a$, is controlled by a downwardly opening charging valve 40, of the puppet type, having its seat in a partition between the chambers 17$^a$ and 18$^a$, and communication between the main air pipe pressure chamber 18$^a$ and the discharge chamber 39$^a$, is controlled by a downwardly opening discharge or exhaust valve 41, also of the puppet type, having its seat in a partition between the chambers 18$^a$ and 39$^a$. The valves 40 and 41 are provided with wings fitting the openings in the partitions which are controlled by the valves, and are, respectively, fixed upon stems 42 and 43, guided in removable caps 44 and 45, closing openings in the casing section 2 through which the valves are introduced and removed as required. The valves 40 and 41 are held normally seated by springs 46 and 47, bearing on their lower sides, and acting in conjunction with the normal excess of pressure thereon.

Opening movement is imparted to the valves 40 and 41, as respectively required in operation, by arms 50 and 51, formed or fixed on the lever handle 7, and projecting in opposite directions therefrom adjacent to the axial line of its shaft 8. The arms 50 and 51, bear respectively, (when the lever handle 7 is moved into the positions in which the detent 12 engages the recess 14$^a$ or abuts against the shoulder 14$^c$, as the case may be) on and depress stems 48 and 49, passing through the shell of the casing section 2, above and in line with the valves 40 and 41 respectively, and resting at their lower ends on said valves. Either of said valves will consequently be unseated by the movement of the lever handle into the appropriate position, during which movement the cock 5 will of course be coincidently moved, so as to open or close the proper communicating ports.

The stem 48 is provided with suitable packing, which is compressed by a gland 52, and as an additional preventive against leakage of train pipe air, a packing ring 53 is slipped around the stem, and is held between its head and the adjacent inner surface of the wall of the chamber 18$^a$. As the valve 41 is subject only to atmospheric pressure on its upper side, packing is not required for the stem 49.

Figure 1:
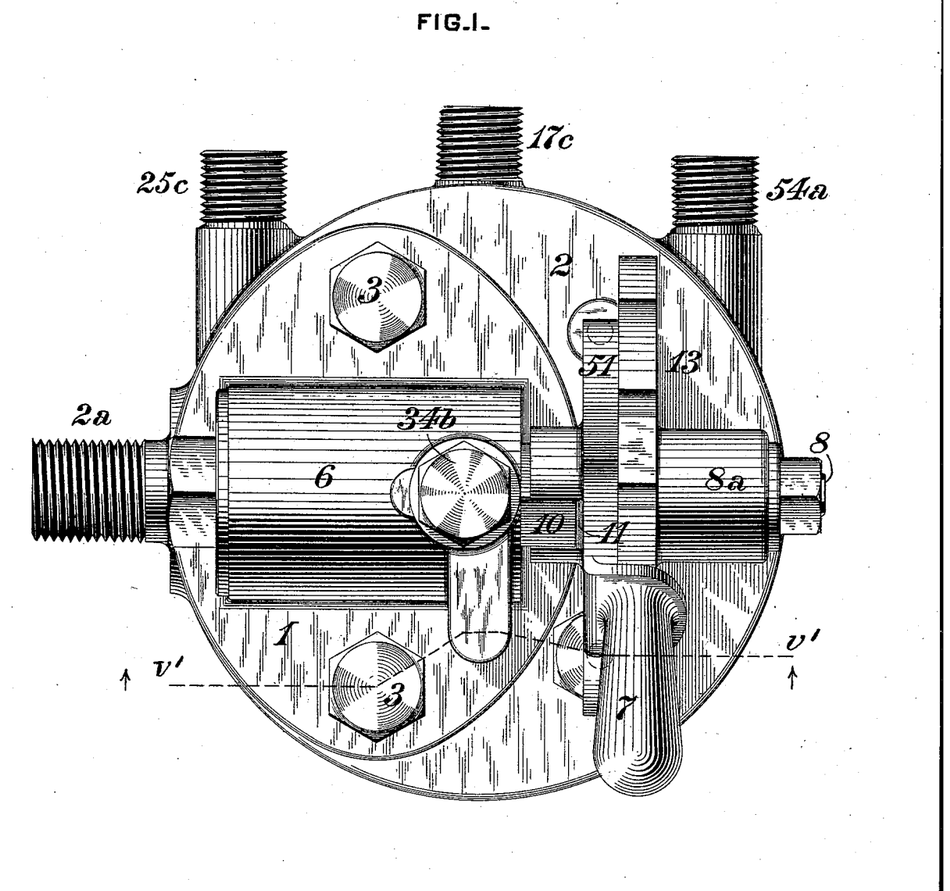
Figure 1 is a plan or top view of an engineer's brake valve illustrating an embodiment of my invention.
Figure 2:
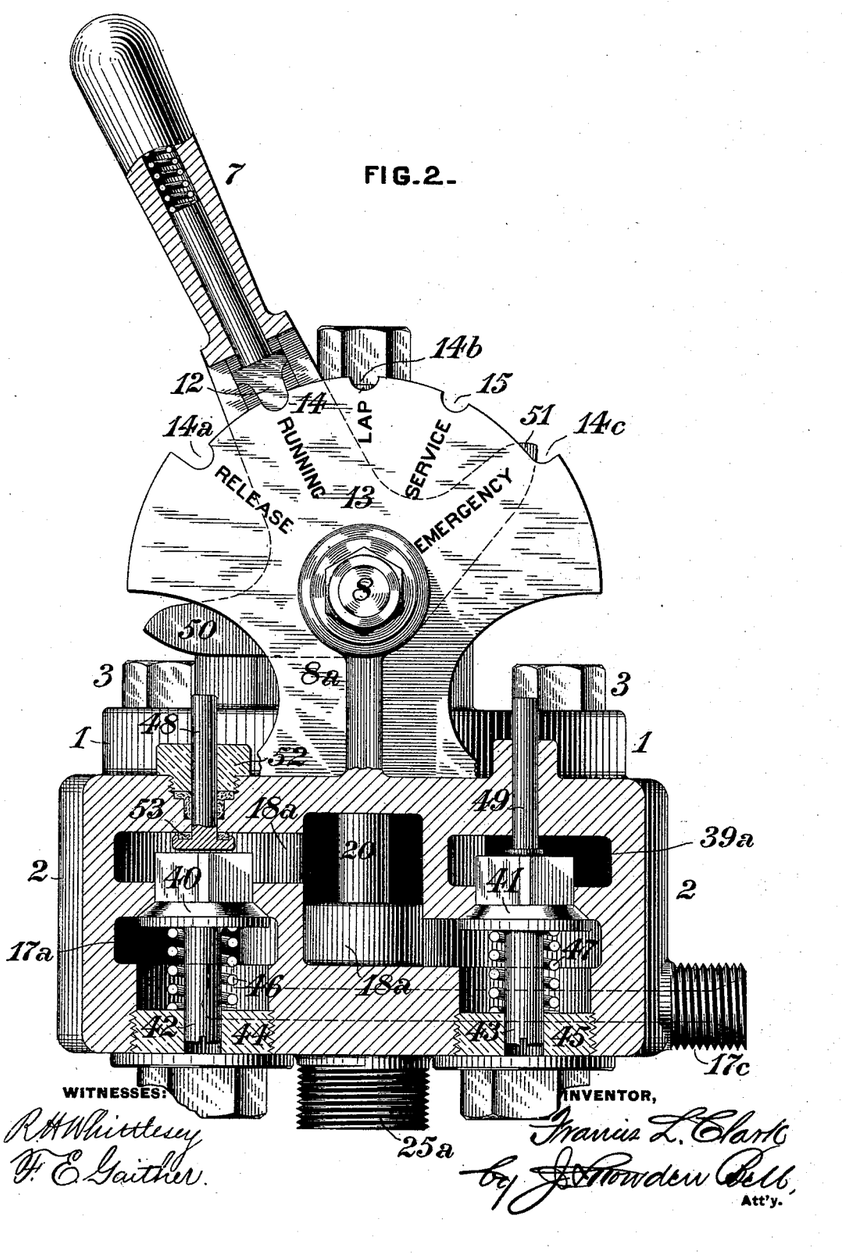
Fig. 2, a view, partly in front elevation, and partly in longitudinal section, at the line $z, z$, of Fig. 4.
Figure 3:
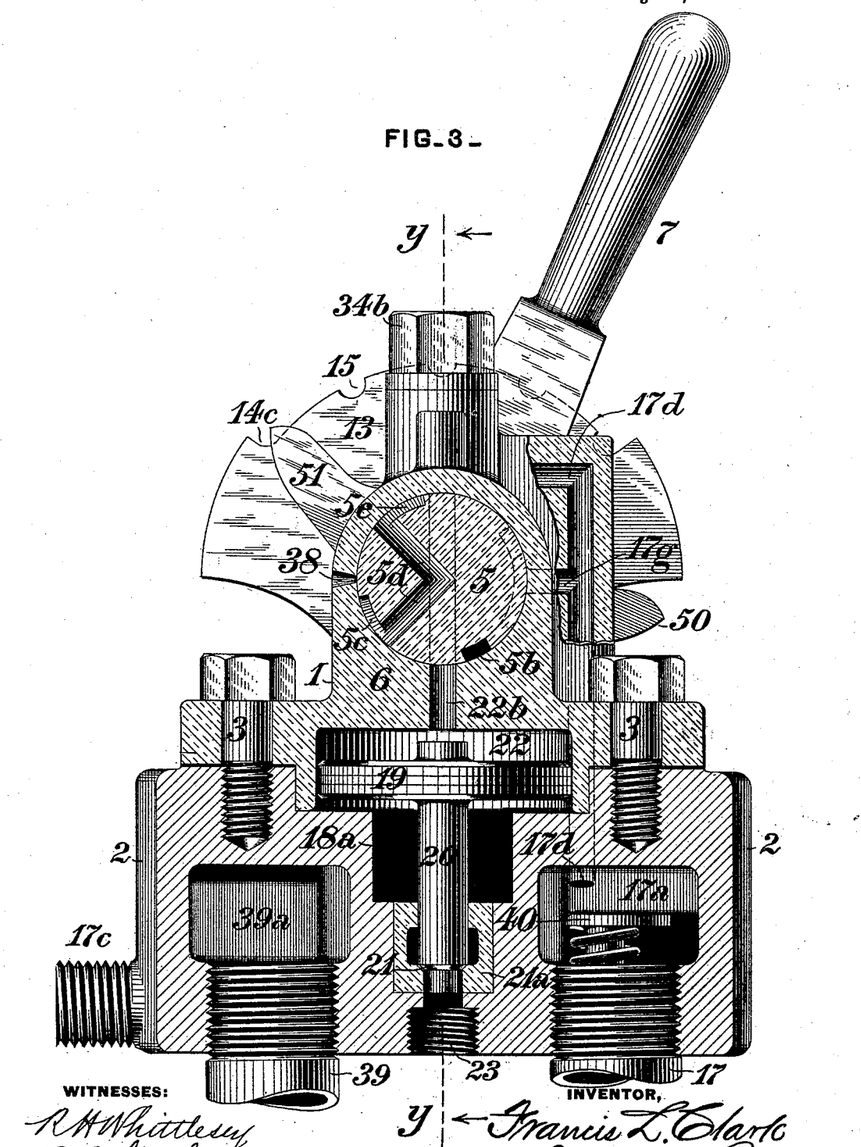
Fig. 3, a longitudinal section at the lines $x, x$, of Fig. 4, and $x', x'$, of Fig. 6, respectively.
Figure 4:
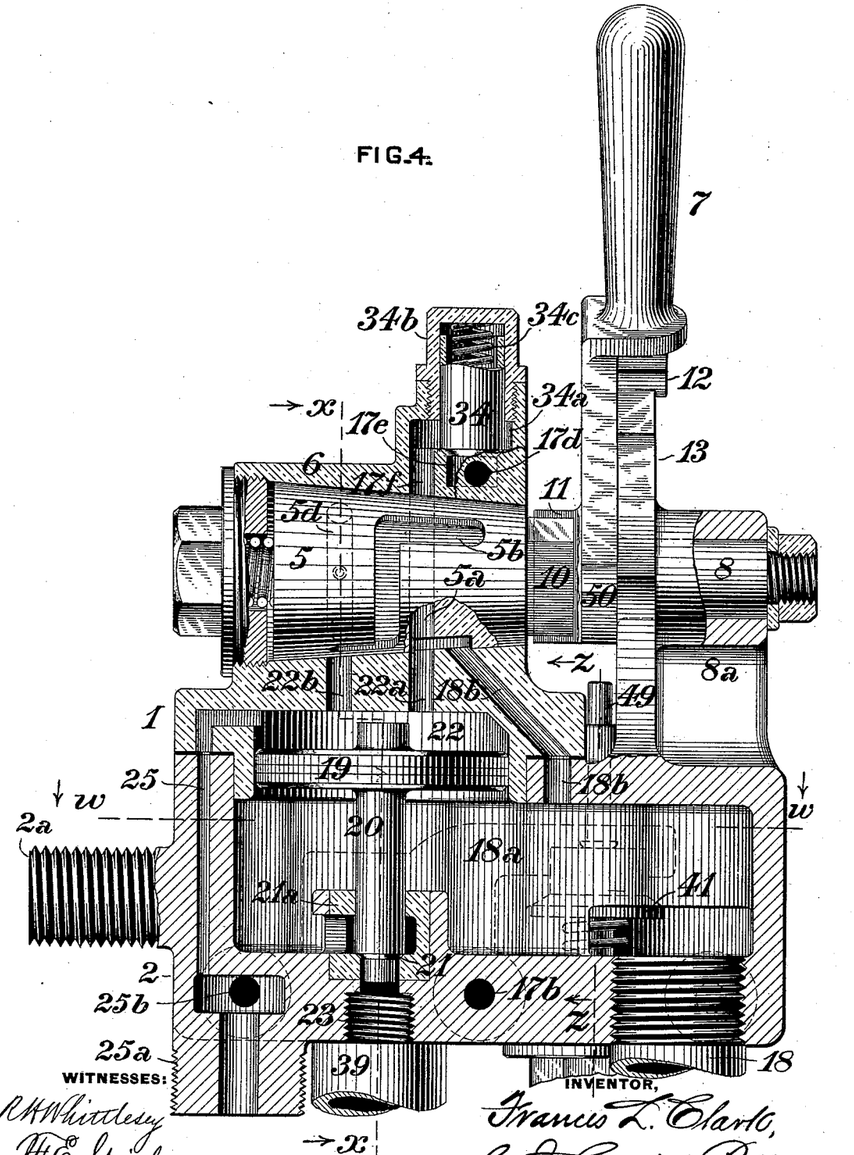
Fig. 4, a view, partly in elevation, and partly in longitudinal section, at the line $y, y$, of Fig. 3.
Figure 5:
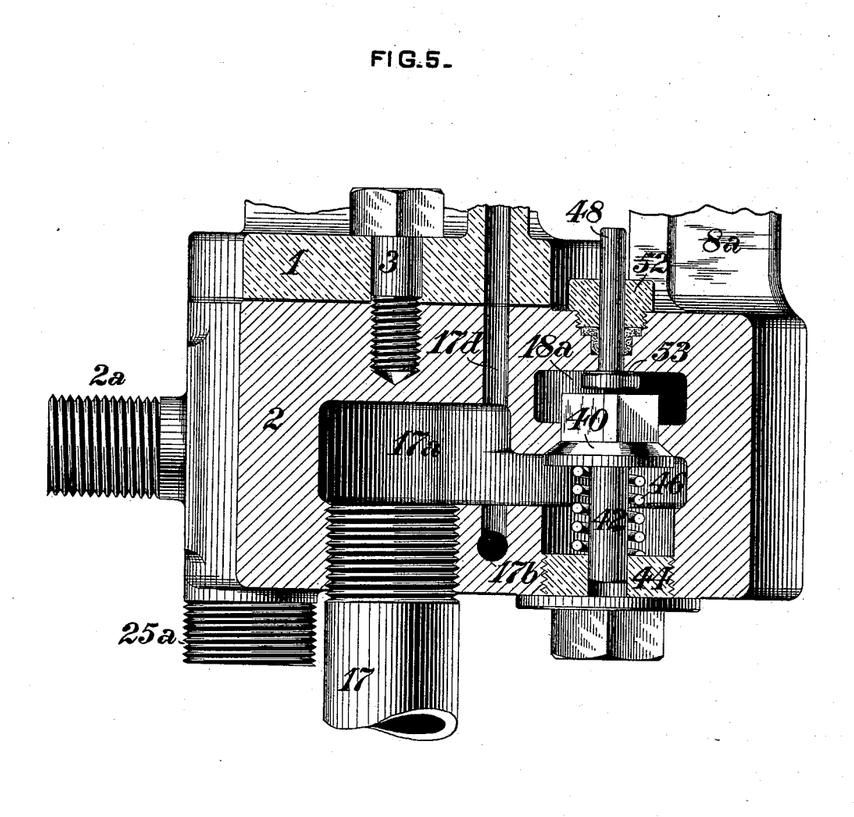
Fig. 5, a longitudinal section at the lines $v', v'$, of Fig. 1, and $v, v$, of Fig. 6, respectively, and Fig. 6, a transverse section at the line $w, w$, of Fig. 4.
Figure 6:
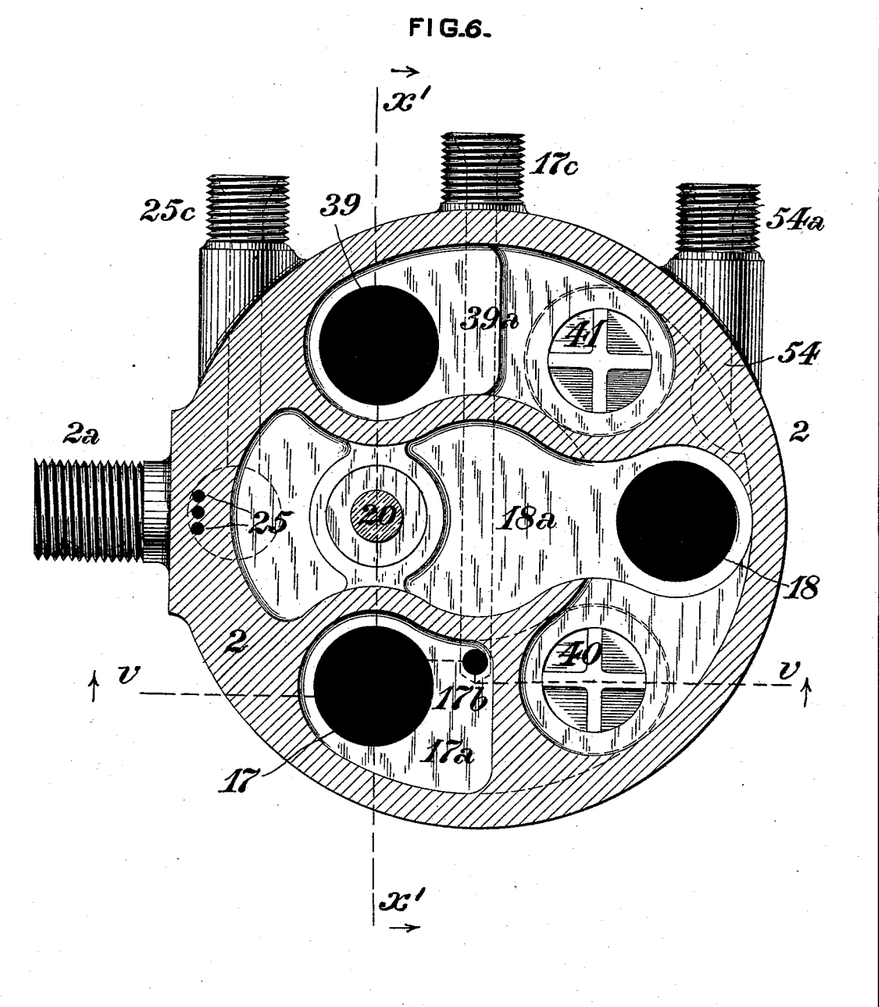

In order to supply air under main air or train pipe pressure to the air pump governor, a port or passage 54, indicated in dotted lines in Fig. 6, is led from the main air pipe pressure chamber 18$^a$ to a nozzle or threaded connection 54$^a$, for the attachment of a pipe leading to the air pump governor.

The regulating cock 5 controls, in the several positions into which it may be moved by the lever handle, as presently to be described, the series of ports and passages in the valve casing, by which communication is established as follows: first, between the main air reservoir and the main air or train pipe, for the purpose of releasing the brakes, and between the main air reservoir and the chamber above the piston 19, in order to charge said chamber, and its connected supplemental reservoir, with air at a pressure equal to that in the main air or train pipe, and thereby to institute an equilibrium of pressure on both sides of the piston 19, and hold the discharge valve 21 to its seat; second, between the main air reservoir and a port leading to the extra pressure valve 34, which governs a passage leading to the main air or train pipe, in order to effect the accumulation of a determined excess of pressure in the main air reservoir to insure the release of the brakes, and also between the main air or train pipe and the chamber above the piston 19, to maintain an equilibrium of pressure in said chamber and the main air or train pipe; third, between the chamber above the piston 19 and the atmosphere, in order to destroy the equilibrium of pressure existing on both sides of the piston, and thereby, through the higher pressure which then acts on the lower side of the piston, to effect its upward movement, and the consequent unseating of the discharge valve 21, for the discharge of air in the application of the brakes in ordinary or service stops, and, fourth, between the main air or train pipe and the atmosphere, through a passage of comparatively large area, in order to effect the application of the brakes with maximum rapidity and force, as in emergency stops.

In what may be termed the "first position," or "release position," of the regulating cock 5, into which it is brought by the movement of the lever handle 7 into such position that the spring stop or detent 12 engages the recess $14^a$ of the segment 13, being the position for charging or recharging the main air or train pipe and for thereby releasing the brakes, the arm 50 of the lever handle 7, bears upon and depresses the stem 48, and, through said stem, unseats the valve 40, thereby opening a passage for air from the main air reservoir to the main air pipe through the pipe 17, chamber $17^a$, opening controlled by the valve 40, chamber $18^a$, and pipe 18. At the same time communication is established between the main air pipe pressure chamber $17^a$, and the chamber 22 above the piston 19, (as well as with the small supplemental reservoir, which is always in communication with the chamber 22, by the passages 25) through the ports $17^d$, $17^g$, the recess $5^b$ of the regulating cock 5, and the port $22^b$. Equilibrium of main air or train pipe pressure above and below the piston 19 is thereby established, and the discharge valve 21 is held to its seat by the pressure on the upper side of the piston equivalent to the area of the valve.

In the second or "running" position of the regulating cock 5, in which, as shown in the drawings, the spring stop 12 engages the recess 14, being the position while running, the arms 50 and 51 are clear of the stems 48 and 49, and the valves 40 and 41 are held seated by their springs 46 and 47 and by the excess pressure on their lower sides. Communication from the main air reservoir to the lower side of the extra pressure valve 34, is established through the pipe 17, chamber $17^a$, port $17^d$, and passage $17^e$, and communication is established from the upper side of said valve to the main air or train pipe, through the port $17^f$, port $5^a$ of the cock 5, port $18^b$, chamber $18^a$, and pipe 18. The extra pressure valve 34 is loaded by a spring $34^c$ to maintain a determined excess of the pressure in the main air reservoir over that in the main air or train pipe, in order that there may always be a reserve pressure in the main air reservoir to insure the release of the brakes. The main air or train pipe is at the same time in communication with the piston chamber 22, on the lower side of the piston 19, through the pipe 18, and chamber $18^a$, and with said chamber 22, on the upper side of the piston, through the pipe 18, chamber $18^a$, port $18^b$, port $5^a$ of the cock 5, and port $22^a$. There is therefore an equalization of main air or train pipe pressure on the opposite sides of the piston 19.

In the third or "service" position of the regulating cock 5, in which the spring stop 12 engages the recess 15, being the position for the application of the brakes in making ordinary or service stops, communication is established between the chamber 22, on the upper side of the piston 19, and the atmosphere, through the port $22^b$, recess $5^c$, port $5^d$, and recess $5^e$, of the cock 5, and preliminary exhaust port 38. The equilibrium of pressure on opposite sides of the piston 19 being consequently destroyed, the piston and connected discharge valve 21 are moved upwardly by the then excess of pressure on the lower side of the piston, and air is discharged from the main air or train pipe, through the pipe 18, chamber $18^a$, opening controlled by the valve 21, and discharge connection 23, for the application of the brakes. After such an amount of air has been discharged as is requisite to apply the brakes with desired force, the regulating cock 5 is moved backward, into what is termed "lap" position, which is about midway between its second and third positions above specified, the spring stop 12 then engaging the recess $14^b$. When in said lap position, all ports are closed, and the discharge of air through the connection 23 continues until the pressure below the piston 19 is reduced slightly below the pressure acting on the upper side of the piston, when the excess of pressure above the piston will gradually move it downwardly, closing the discharge valve 21 and cutting off the discharge of air from the main air or brake pipe. The slow and gradual downward movement of the piston, in closing the discharge valve, admits of sufficient time for the equalization of pressure throughout the entire length of the main air or train pipe and thereby insures a substantially uniform application of the brakes on all the cars of a long train. The discharge of air may be repeated one or more times by returning the regulating cock 5 to its service position, after having been brought to lap, and the application of the brakes with any desired degree of force may be effected by repeated discharges of air from the chamber above the piston.

In the "emergency" position of the regulating cock, in which the spring stop 12 abuts against the end shoulder 14ᶜ of the segment 13, being the position for the application of the brakes in making emergency stops, the arm 51, of the lever handle 7, bears upon and depresses the stem 49, and, through said stem, unseats the valve 41, thereby opening a passage of comparatively large area from the main air or train pipe to the atmosphere, through the pipe 18, chamber 18ᵃ, opening controlled by the valve 41, chamber 39ᵃ, and discharge pipe 39. In this, as in the service position, pressure is relieved from the upper side of the piston 19, through the port 22ᵇ, recess 5ᶜ, port 5ᵈ, and recess 5ᵉ of the cock 5, and preliminary exhaust port 38. The free and rapid discharge of air from the main air or train pipe which is effected as above described, provides for the application of the brakes with maximum rapidity and force, as required in making emergency stops.

An engineer's brake valve as herein described and shown is of small compass and can be readily applied on a locomotive engine. The movement of the operating handle in a vertical plane can be conveniently made by the engineer, and the regulating cock not being exposed to unbalanced pressure upon a large area, such movement does not require any material exertion of power by the operator. Access may be had to all working parts, and the same may be removed and replaced, whenever required, without breaking any pipe connections, the regulating cock 5 being removable by unscrewing and removing its cap, the valves 40 and 41 by removing their caps 44 and 45, and the piston 19, and discharge valve 21, by unscrewing the tap bolts 3 and removing the upper casing section 1. The excess pressure valve can be removed by removing its screw cap 34ᵇ. It will also be seen that by reason of the clutch engagement of the regulating cock and its operating lever handle, and the support of the lever handle in a bearing independent of the cock, the latter is relieved from any strain in operation tending to impose undue or unequal wear upon it. A further advantage is found in the fact that the detent of the lever handle not being engaged with a recess when in the emergency position, the valve 41 controlling the emergency discharge passage is not held open by a positively engaged lever, and is permitted to close automatically on the withdrawal of pressure by the operator on the lever handle, thereby obviating waste of air and delay which would otherwise result from an unnecessary escape of air from the main air or train pipe, after an emergency application has been made.

I claim as my invention and desire to secure by Letters Patent—

1. In an engineer's brake valve, the combination of a lower valve casing section provided with connections for pipes to a main air reservoir and to a main air or train pipe, a movable abutment, a discharge valve actuated by said abutment and controlling the exhaust of air from the main air or train pipe, an upper casing section connected to the lower section and removable therefrom independently of the pipe connections, and a regulating cock or valve working in the upper section, and controlling ports through which an equilibrium or an inequality of pressure, as the case may be, is established on opposite sides of the movable abutment, substantially as set forth.

2. In an engineer's brake valve, the combination of a valve casing provided with connections for pipes to a main air reservoir and to a main air or train pipe, a movable abutment working in said casing, a discharge valve actuated by said abutment and controlling the exhaust of air from the main air or train pipe, a charging valve controlling communication between the main air reservoir connection and the main air or train pipe connection, a regulating cock or valve controlling ports through which an equilibrium or an inequality of pressure, as the case may be, is established on opposite sides of the movable abutment, and an operating lever handle imparting movement to the regulating cock or valve and to the charging valve, substantially as set forth.

3. The combination in an engineer's brake valve, of a valve casing provided with connections for pipes to a main air reservoir and to a main air or train pipe, a movable abutment working in said casing, a discharge valve actuated by said abutment and controlling the exhaust of air from the main air or train pipe, a charging valve controlling communication between the main air reservoir connection and the main air or train pipe connection, an exhaust or discharge valve controlling communication between the main air or train pipe connection and the atmosphere, a regulating cock or valve controlling ports through which an equilibrium or an inequality of pressure, as the case may be, is established on opposite sides of the movable abutment, and an operating lever handle imparting movement to the regulating cock or valve, to the charging valve, and to the exhaust or discharge valve, substantially as set forth.

4. The combination, in an engineer's brake valve, of a valve casing provided with connections for pipes to a main air reservoir and to a main air or train pipe, a movable abutment working in said casing, a discharge valve actuated by said abutment and controlling the exhaust of air from the main air or train pipe, a charging valve controlling communication between the main air reservoir connection and the main air or train pipe connection, a regulating cock or valve controlling ports through which an equilibrium or an inequality of pressure, as the case may be, is established on opposite sides of the movable abutment, an operating lever handle coupled to the regulating cock or valve, and an arm fixed to the operating lever handle and adapted to impart opening movement to the charging valve, at a desired point in the traverse of the arm, without positive connection to said valve, substantially as set forth.

In testimony whereof I have hereunto set my hand.

FRANCIS L. CLARK.

Witnesses:
J. SNOWDEN BELL,
F. E. GAITHER.